INVENTOR.
EUGENE E. MERFELD
BY [signature]
ATTORNEY

ELECTRICAL CIRCUIT OPERATION MONITORING APPARATUS

Filed Dec. 21, 1960 2 Sheets-Sheet 2

INVENTOR.
EUGENE E. MERFELD
BY Henry L. Hanson
ATTORNEY 3,117,219
Patented Jan. 7, 1964

3,117,219

ELECTRICAL CIRCUIT OPERATION MONITORING APPARATUS

Eugene E. Merfeld, Lexington, Mass., assignor to Minneapolis-Honeywell Regulator Company, Minneapolis, Minn., a corporation of Delaware Filed Dec. 21, 1960, Ser. No. 77,447
6 Claims. (Cl. 235—153)

Figure 1:
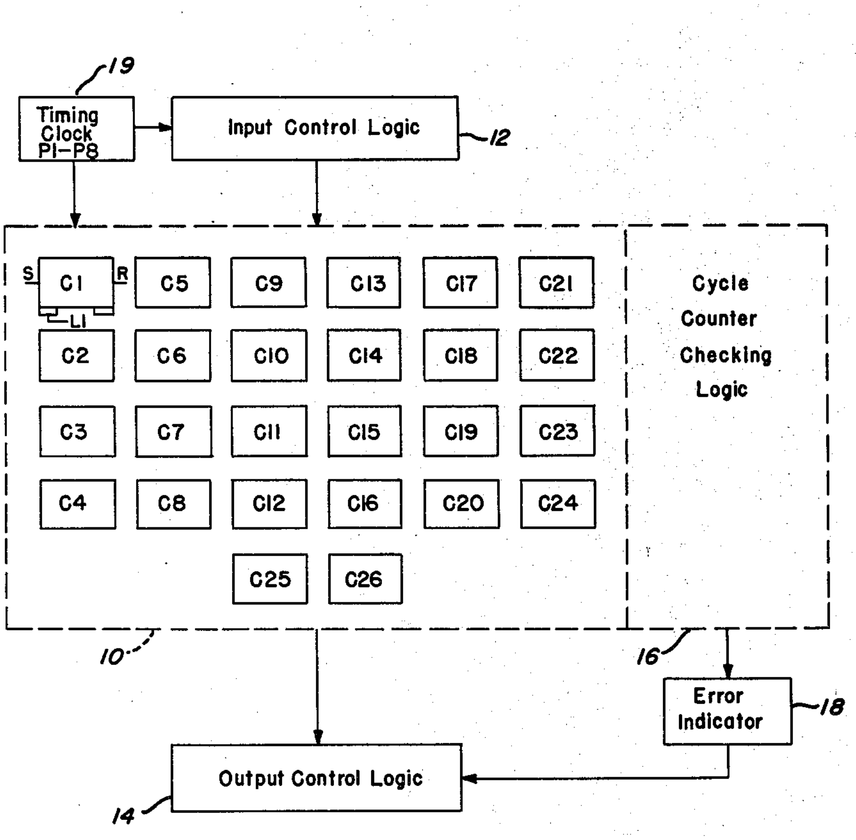

A general object of the present invention is to provide a new and improved checking apparatus for an electrical pulse manipulating circuit. More specifically, the present invention is concerned with a new and improved checking apparatus which is adapted to check that one, and only one, of a plurality of signal lines having a signal thereon at a particular instant in combination with means for checking to see that the checking apparatus in itself is functioning properly.

In the field of data processing, the over-all control system logic may be organized in such a manner that there will be a plurality of separate control stages associated with the performance of a number of different types of orders which may be performed by the data processing system. These control stages are sometimes referred to as cycle counters and are generally arranged in preselected groups which are uniquely related to the time and steps required to perform program orders in the particular data processing system. Thus, one particular program order such as an ADD order may required 4 cycles, while in the same system a MULTIPLY order might require 11 distinct cycles. Regardless of how many cycles a particular order may require for its completion, it is essential in the organizaton of the over-all data processing system that one, and only one, timing cycle be active in the control of the performance of the system at any particular instant. In the event that none or more than one cycle is indicated to be active at any one time, there must be an appropriate indication made of this fact so that the system may be stopped.

It is therefore a further more specific object of the present invention to provide a new and improved checking circuit for the cycle counter stages of a data processing system to ensure that one, and only one, of the cycle counter stages is active at any one particular instant.

In a copending application of Henry W. Schrimpf bearing Serial Number 636,256 and filed January 27, 1957, there is disclosed a representative form of data processing system utilizing cycle counters for establishing the over-all logical timing associated with the program orders of the system. In that particular data processing system there are 8 cycle counter stages, so that the building of a checking circuit to see that one, and only one, of these 8 cycle counters is active at any one time is fairly direct from the logical sense in that the active outputs of the cycle counters are selectively gated with all other like outputs of the cycle counters two at a time. Where there are only 8 cycle counters, as in the aforementioned data processing system, the complication of providing such a checking circuit can be tolerated. However, as the number of cycle counter stages increases, the complexity of checking such a circuit by techniques heretofore known becomes complex beyond the point of reason so that the checking of this area of data processing systems has frequently been neglected.

In accordance with the teachings of the present invention, the checking of a multiple-stage cycle counter has been greatly simplified. This simplification has been brought about by unique application of time-sharing to a plurality of gating circuits which operate in conjunction with an error-indicating circuit, the latter producing an output in the event that more than one cycle counter stage is active at any one time. In the process of providing such a gating circuit, provisions have also been made to ensure that at least one of the cycle counter stages is active at any one time. The logic of the circuit has further been arranged so that it is self-checking in nature and will produce an error if there is a failure of the checking circuit, as well as a failure of the timing pulses associated with the checking of the individual cycle counter stages.

It is therefore a still further object of the present invention to provide a new and improved circuit for checking to see that one, and only one, of a plurality of signal lines is active at a particular instant by utilizing a plurality of gating sections activated on a time-shared basis.

Another more specific object of the invention is to provide a checking circuit for checking to see that one, and only one, active input signal is present in combination with a self-checking logical circuit for the elements of the checking circuitry.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 2:
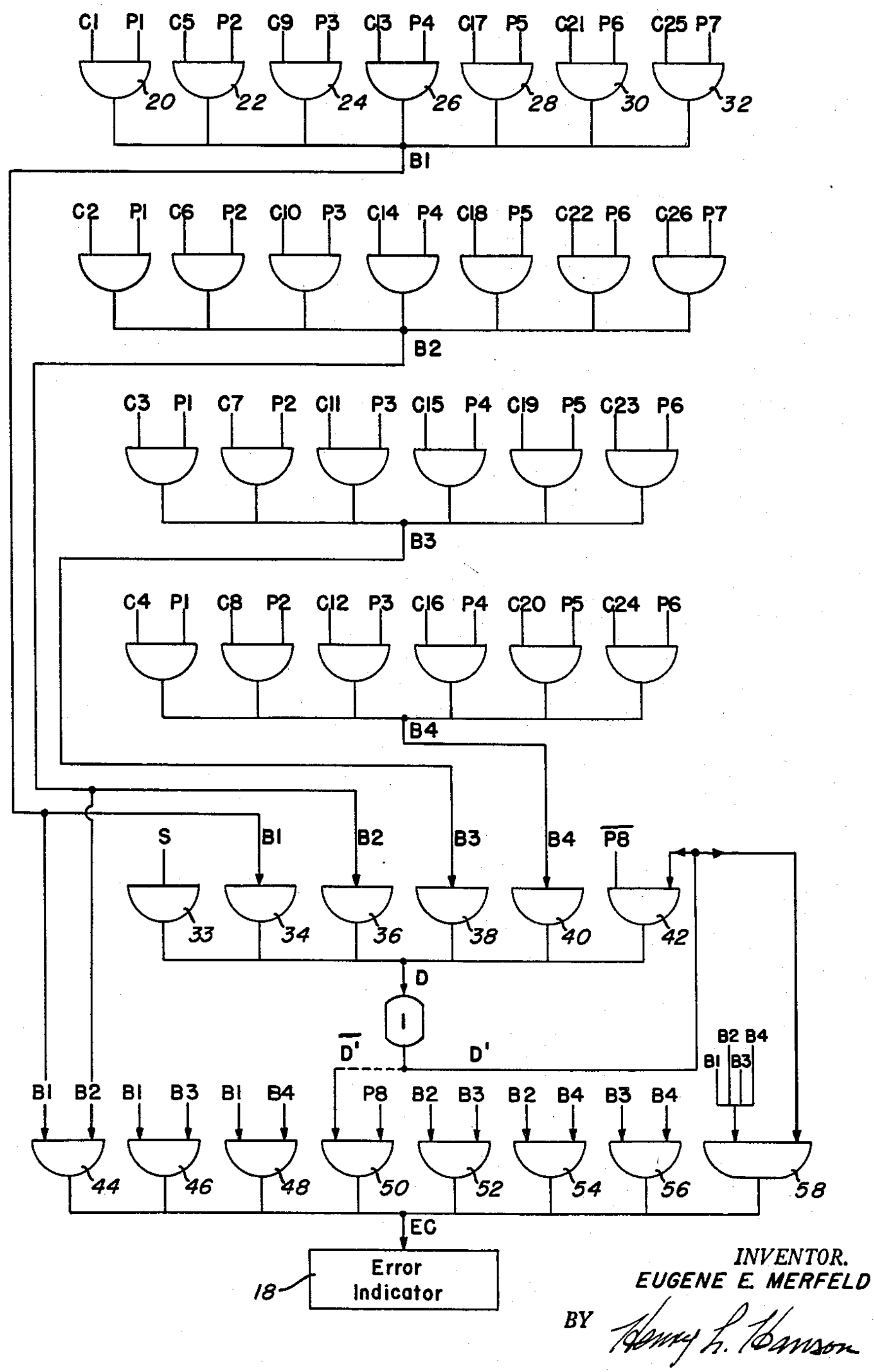

Of the drawings:

FIGURE 1 is a diagrammatic representation of a portion of a data processing system with which the present invention may be associated; and FIGURE 2 is a diagrammatic representation of logical circuitry required for implementing the checking features of the present invention.

Referring first to FIGURE 1, the numeral 10 identifies a plurality of cycle counters which may be associated with a data processing system. Within the enclosure 10 there are indicated to be 26 different cycle counters C1–C26. Each of these cycle counters may take the form of a synchronous bistable flip-flop of the static or dynamic type well known in the art. Each of these bistable circuits, representing the bistable counter stages C1 through C26, will normally be adapted to have certain input logic for either setting or resetting the particular cycle counter stage which is to be active at a particular instant in the control of the operation of an associated data processing system. The activating of a particular cycle counter stage will, of course, depend upon the particular program order that is to be performed. Consequently, certain input control logic will be required for the cycle counter stages and this input control logic is referred to generally at 12. The form of this logic may be of the general type disclosed in the above-mentioned Schrimpf application.

When a particular cycle counter stage has been set, the output signals thereof are used in certain output control logic associated with the data processing system, and this is indicated generally at 14. Again, the specific form in which the cycle counter output is used will depend upon the data processing system. A representative system may again be of the type disclosed in the aforementioned Schrimpf application.

Inasmuch as a data processing system cannot operate with more than one cycle counter active at a particular instant, it is necessary to provide cycle counter checking logic therefor, which has been indicated generally at 16. In the event that there is an error, due to failure of a cycle counter to operate, the operation of 2 cycle counter stages at the same time, or a failure in the checking logic of the cycle counter check circuit, an error should be produced in the error-indicating circuit 18. The output from the error indicator 18 may be utilized to shut down the associated data processing system by, for example, deactivating the output logic 14.

In considering the general operation of the circuit shown in FIGURE 1, upon the occurrence of a particular input program order, the input control logic will be arranged to activate a particular one of the cycle counter stages. If the cycle counter stage is the stage C1, this stage will be active for a predetermined time interval which may well be divided into a series of sub-intervals which are uniquely defined by the occurrence of a series of clock pulses within the cycle time. In one embodiment of the invention, the cycle time of each counter stage was defined in terms of a series of 8 clock pulses derived from a timing clock 19 associated with the data processing system. Once a particular cycle counter stage is operated, it will remain operated, or in its set state, until the timing clock provides a signal which will reset this stage and, in accordance with the input control logic 12, must set a further stage, such as the stage C2 or C4, or any other particular cycle counter stage. The stepping from one cycle counter stage to another will continue until such time as the program order being performed is completed. Another control order will then be examined by the input control logic, and this logic will then supply the necessary signals to step through another predetermined sequence in the cycle counter stages as the sequence may relate to the performance of that order.

Referring next to FIGURE 2, there is here illustrated the logical detail of the cycle counter checking circuit referred to generally at 16 in FIGURE 1. The signals fed into the checking circuitry are the C1–C26 signals which are the active outputs of the cycle counter stages shown in FIGURE 1. When the operation is normal, only one of these input signal lines will be active at any one time. The other inputs to the checking circuitry are the timing pulses P1 through P8.

A separate input gating section is provided for each of the signal lines from the respective cycle counter stages C1 through C26. Associated with each of these separate gating circuits is an input from one of the timing pulse lines from the clock source 19. These gating sections are then arranged in sets wherein each set comprises a series of cycle counter input gates, only one of which will be clocked to be active at any one particular time. The outputs of the gating sections of each set are buffered together in a buffer amplifier, the amplifiers being indicated in FIGURE 2 at B1, B2, B3 and B4. Thus, the buffer amplifier B1 has as an input a series of gating sections 20, 22, 24, 26 28, 30 and 32. These gating sections are associated respectively with the input signal lines C1, C5, C9, C13, C17, C21 and C25. Further, the timing pulse or clock pulse signals associated with the respective gates are P1, P2, P3, P4, P5, P6 and P7. If, for example, a cycle counter stage C13 is active, the input signal line C13 will have a signal thereon which will be applied to the gate 26. During the time that the cycle counter stage C13 is set, or active, all of the timing clock pulses P1 through P8 will occur. At time P4, a pulse will appear on the P4 line on the input of gate 26 and, consequently, a pulse will pass through the gating section 26 to the output of the buffer amplifier B1. A similar operation will be associated with each of the other signal lines at the appropriate clock pulse times under normal operating conditions.

It will be seen that each of the other buffer amplifier inputs are formed in a manner corresponding to that of the buffer amplifier B1.

A further part of the checking circuitry is a synchronous, bistable circuit D which has a series of input set gating sections 34, 36, 38 and 40, and a reset or recirculation gate 42. The inputs to the set gating sections 34, 36, 38 and 40 are the outputs of the respective buffer amplifier circuits B1, B2, B3 and B4. The input to the reset gating section 42 is the negation of the timing clock pulse P8, or $\overline{P8}$. This timing pulse input circuit will be active on the gating section 42 at all times except at the time P8, which time is the time assigned for switching the set condition from one cycle counter stage to another.

The output of the bistable circuit D is the delay line of one pulse period. The assertion and the negation of the output will be available one pulse period after the signal has appeared on the output of one of the gating sections on the input to the circuit.

The output for the checking circuit comprises an error check circuit EC, the latter taking the form of a gate buffer amplifier combination. The input gating sections to this circuit comprise the gating sections 44, 46, 48, 50, 52, 54, 56 and 58. The gating sections 44, 46, 48, 52, 54 and 56 are associated with the outputs of the buffer amplifiers B1 through B4 with the inputs being so arranged that each buffer amplifier output is compared with every other buffer amplifier output so that if any two buffer amplifiers have a signal thereon at the same time, the associated gating section will have an output which will be passed to the error indicator 18. The gating section 50 functions with the timing pulse P8 on the input thereof, along with the negation of the output of the bistable circuit D. The gating section 58 has a buffer-gate combination wherein all of the buffer amplifier outputs B1 through B4 are buffered together on one input gate leg and the delayed output of the bistable circuit D is applied to the other input gate leg. In the event that a signal passes through either of the gating sections 50 or 58, a signal will be passed to the error indicator 18, indicating a malfunction.

Considering the over-all operation of the checking circuit of FIGURE 2, it should first be noted that the conditioning of the checking circuit requires the application of a set pulse S to the bistable circuit C. This may be accomplished by way of an input set signal applied to the gating section 33 on the set side of the bistable circuit D. At time P1 the output of a cycle counter stage will be switched into an active state. If the cycle counter stage is the stage C1, the signal line C1 on the gate 20 will become active at time P1. At time P1, the gating section 50 on the error checking circuit EC will have the input gate leg P8 active and the negation or reset output of the bistable circuit D will normally be inactive. If the bistable circuit D was not set by the set pulse S, the negation line $\overline{D}$ will be active and a signal will be passed through the gating section D to the output error indicator 18. If the bistable circuit was set at the outset by the set pulse S, the circuit will be reset at time P8 due to the disappearance of the signal $\overline{P8}$ on the input of the gating section 42. Thus, a time P1, the output from the delay line of the circuit should be inactive.

Inasmuch as a signal will be passed through the gating section 20 at time P1, when the cycle counter stage C1 is active, the B1 output of the buffer amplifier will be applied to the gating sections 44, 46, 48 and 58. If no other buffer amplifier has an output at the time that there is an output from the amplifier B1, there will be no signal passed through any of the gates 44, 46 or 48. Further, at time P1, if the assertive signal from the bistable circuit D is inactive, no signal will pass through the gating section 58. However, should the bistable circuit D not be reset, the output line carrying the assertive signal will be active and the signal will be coupled through the gating section 58 upon the occurrence of the B1 signal to indicate an error.

If the next cycle counter stage to be activated is the stage C6, this activation will occur at time P1. However, the checking circuit will not sense whether or not this cycle counter stage is active until time P2. At this time, a signal will be passed through the buffer amplifier B2 to the error checking circuit EC. Inasmuch as the buffer amplifier B2 should be the only one active, this will be checked by way of the gating sections 44, 52 and 54. If no other buffer amplifier output is active at the same time, there will be no error signal produced in the error indicator 18. Upon the occurrence of the B2 signal, this B2 signal will be applied to the set gate 36 on the input of the bistable circuit D, the latter of which will have been reset at time P8. If the bistable circuit D remained in the reset state until the application of the B2 signal, which will have occurred at time P2, the application of the B2 signal to the gate 58 will not pass through this gate for the reason that the assertive output will remain inactive for a pulse period. As before, if the bistable circuit was not reset at time P8, the assertive output line will be active so that a signal can be coupled through the gating section 58 to the error indicator 18 upon the occurrence of the B2 signal.

It is important to note that the occurence of the B2 signal has caused the bistable device D to be set and that this bistable device D will remain set for the remainder of the present cycle.

This is instrumental in checking not only that no more than one cycle counter is active at any time, but also to check that at least one cycle counter is active at any time. If no cycle counter is active, none of the gate amplifiers B1, B2, B3 or B4 will be active during a given cycle hence the bistable device D will not get set during any of the pulse periods P1–P7, hence at time P8 the negation of the bistable device D will be active and thus cause gate 59 to become active and indicate an error.

It will be seen that a similar operation will be applicable to each of the other inputs to the signal lines from the cycle counter stages. Thus, in each checking operation, there is a check to see that no more than one cycle counter stage is active at any one time, and a further check made to see that the bistable circuit C, which is checking the accuracy of the timing pulses associated with the line sampling, is capable of indicating an error condition. It will be seen that this error condition check actually extends back to a check of the timing clock pulses as it may relate to the individual clock input terminals.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure by Letters Patent is:

1. Apparatus for checking a plurality of independent functions, only one of which is adapted to be active at any one time, a separate input signal line for each function, a timing signal source having a plurality of separate cyclically recurring timing pulses, each cycle of which comprises less pulses in number than the number of functions, a plurality of gating sections each of which comprises a plurality of separate AND gating circuits having their outputs buffered together, each AND gating circuit having a separate timing signal input and a separate function input signal, a further gating section comprising a plurality of separate AND gating circuits connected so that the outputs of two different ones of said first-named gating sections are connected to each of the inputs of said gating circuits of said further gating section, and means buffering the outputs of said last-named gating circuits to an error indicator.

2. Apparatus for monitoring a plurality of independent functions, one, and only one, of which is adapted to be active at any one time, a separate input signal line representing each function, a timing signal source having a plurality of separate cyclically recurring timing pulses, each cycle of which comprises less timing pulses in number than the total number of functions, a plurality of gating sections each of which comprises a plurality of separate AND gating circuits having their outputs buffered together, each AND gating circuit having a pair of input gate legs connected one each to a separate timing signal input and a separate function input signal, a further gating section comprising a plurality of separate AND gating circuits each having a pair of input gate legs connected so that the outputs of two different ones of said first-named gating sections are connected to the input gate legs thereof, and means buffering the outputs of said last-named gating circuits to an error indicator.

3. Apparatus for checking a plurality of independent functions, only one of which is adapted to be active at any one time, a separate input signal line for each function, a timing signal source having a plurality of separate cyclically recurring timing pulses, each cycle of which comprises less pulses in number than the number of functions, a plurality of gating sections each of which comprises a plurality of separate AND gating circuits having their outputs buffered together, each AND gating circuit having a separate timing signal input and a separate function input signal, a further gating section comprising a plurality of separate AND gating circuits connected so that the outputs of two different ones of said first-named gating sections are connected to the inputs thereof, a bistable circuit having a set input and a reset input, means connecting an output from each of said first-named gating sections to said set input, means connecting a timing output signal to said reset circuit so that said bistable circuit is reset each cycle, means connecting an output from said bistable circuit and said timing signal source to a further gating circuit of said further gating section, and means buffering the outputs of said last-named gating circuits to an error indicator.

4. Apparatus for checking a plurality of independent functions, only one of which is adapted to be active at any one time, a separate input signal line for each function, a timing signal source having a plurality of separate cyclically recurring timing pulses, each cycle of which comprises less pulses in number than the number of functions, a plurality of gating sections each of which comprises a plurality of separate AND gating circuits having their outputs buffered together, each AND gating circuit having a separate timing signal input and a separate function input signal, a bistable circuit having a set input and a reset input, means connecting the output of each of said gating sections to said set input, means connecting said timing signal source to said reset input so that once during each cyclic operation said circuit will be reset, and means gating the output of said bistable circuit with said timing signal source to produce an error indication if said bistable circuit was not set a pulse period prior to the application of the reset pulse thereto.

5. Apparatus for checking a plurality of independent functions, only one of which is adapted to be active at any one time, a separate input signal line for each function, a timing signal source having a plurality of separate cyclically recurring timing pulses, each cycle of which comprises less pulses in number than the number of functions, a plurality of gating sections each of which comprises a plurality of separate gating circuits having their outputs buffered together, each gating circuit having a separate timing signal input and a separate function input signal, a bistable circuit having a set input and a reset input, means connecting the output of each of said gating sections to said set input, means connecting said timing signal source to said reset input so that once during each cyclic operation said circuit will be reset, means gating the output of said bistable circuit with said timing signal source to produce an error indication if said bistable circuit was not set a pulse period prior to the application of the reset pulse thereto, and means gating a further output of said bistable circuit with the outputs of each of said gating sections to produce an error indication if any one of said gating sections has an output at the same time that said bistable circuit should indicate a reset state.

6. Apparatus for checking a plurality of independent functions, only one of which is adapted to be active at any one time, a separate input signal line for each function, a timing signal source having a plurality of separate cyclically recurring timing pulses, each cycle of which comprises less pulses in number than the number of functions, a plurality of gating sections each of which comprises a plurality of separate gating circuits having their outputs buffered together, each gating circuit having a separate timing signal input and a separate function input signal, a bistable circuit having a set input and a reset input, means connecting the output of each of said gating circuits to said set input, means connecting said timing signal source to said reset input so that once during each cyclic operation said circuit will be reset, means gating the output of said bistable circuit with said timing signal source to produce an error indication if said bistable circuit was not set a pulse period prior to the application of the reset pulse thereto, means gating a further output of said bistable circuit with the outputs of each of said gating sections to produce an error indication if any one of said gating sections has an output when a reset condition should be indicated on the output of said bistable circuit, and means gating a different pair of outputs of said gating sections to produce an error indication if a signal passes through any one of said last-named gating means.

References Cited in the file of this patent

Enslein: Two Economic Circuits for High-Speed Checking of Contact Closures, IRE Transactions on Instrumentation, September 1959.